April 10, 1956   J. F. GAGE ET AL   2,741,737
CALIBRATING AND TESTING APPARATUS

Filed Feb. 6, 1953   2 Sheets-Sheet 1

Inventors
James F. Gage,
Charles W. Miller &
Harold E. Todd

By Willits, Helwig & Baillio
Attorneys

April 10, 1956 J. F. GAGE ET AL 2,741,737
CALIBRATING AND TESTING APPARATUS
Filed Feb. 6, 1953 2 Sheets-Sheet 2
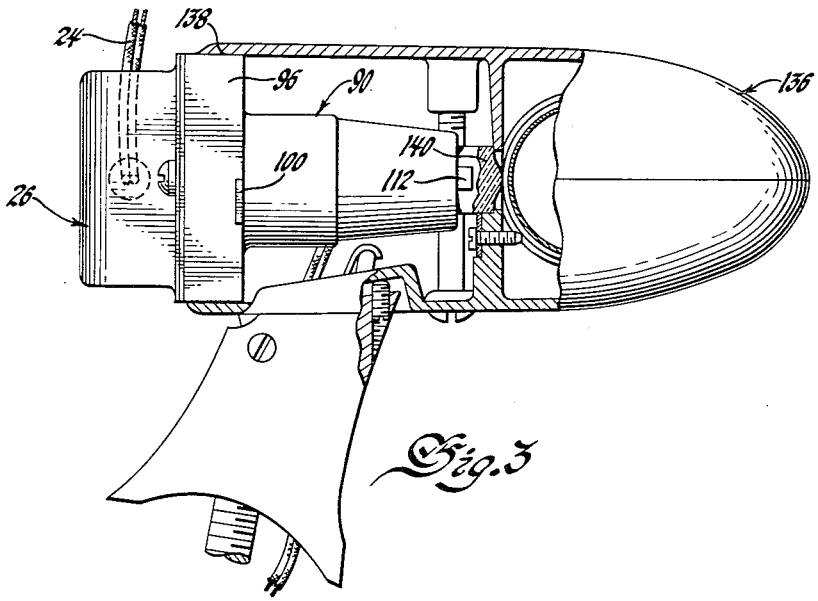
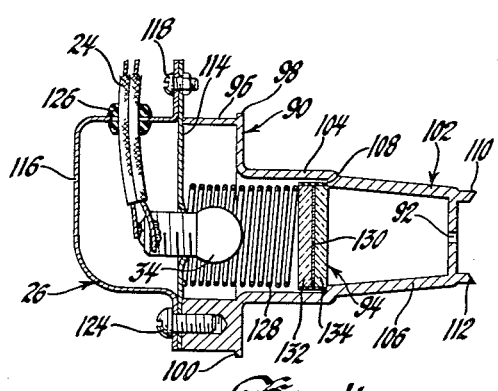
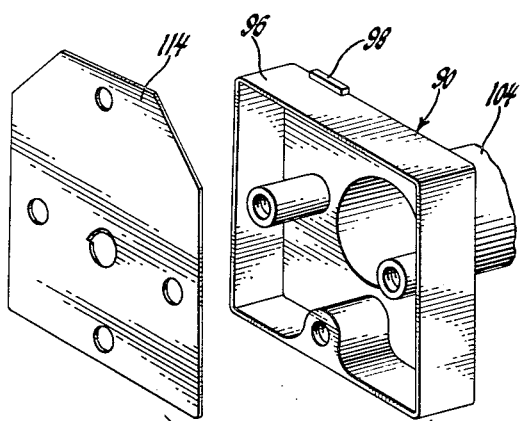
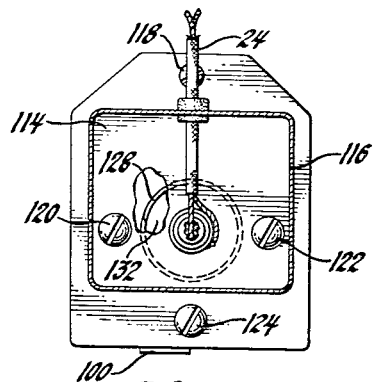
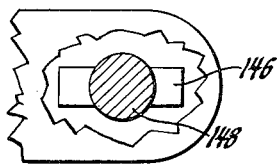
Inventors
James F. Gage,
Charles W. Miller &
Harold E. Todd
By Willits, Helwig & Baillio
Attorneys United States Patent Office 2,741,737
Patented Apr. 10, 1956

2,741,737

CALIBRATING AND TESTING APPARATUS

James F. Gage, Charles W. Miller, and Harold E. Todd, Anderson, Ind., assignors to General Motors Corporation, Detroit, Mich., a corporation of Delaware Application February 6, 1953, Serial No. 335,498

4 Claims. (Cl. 324—24)

This invention relates to a testing and calibrating apparatus for an automatic headlamp dimmer and similar light-sensitive devices utilizing a photosensitive cell.

Automatic headlamp dimmers generally employ a photosensitive element which is mounted in a light pickup unit and which is reactive to the headlamps of oncoming vehicles so as to actuate an electrical circuit which serves to switch the vehicle headlamps to low beam when the oncoming vehicle is at a predetermined distance, and to switch the headlamps back to high beam when the oncoming vehicle has passed. The dimmer circuit provides some holding means for maintaining the headlamps on low beam once they have been dimmed in response to the initially bright illumination from the oncoming vehicle, thereby avoiding flashing by the ensuing reduction of illumination from the latter vehicle when its headlamps are subsequently dimmed. Generally, such holding means is accomplished in one of two ways: (1) by providing within the circuit a suitable time delay that prevents restoration to bright lights for a predetermined time, and (2) by providing within the circuit means operative to maintain the headlamps in a dimmed condition even by the decreased intensity level from the approaching vehicle, once the headlamps are initially dimmed by actuation of the circuit. Thus, with the first type of holding means, an initial threshold light intensity is required to actuate the circuit and thereby dim the lights, the lights being restored to bright condition after expiration of the time delay. With the second type of holding means, a first threshold light intensity is required to cause the lights to dim and a second threshold light intensity, lower than the first mentioned threshold intensity, is required to maintain the lights in a dimmed condition. In either case, the device, in order to function properly must be calibrated so that it responds to a predetermined light intensity at a predetermined distance, and if the second mentioned type of holding means is utilized, the device must additionally be calibrated so that it functions to retain the headlamps in dimmed condition until the oncoming light falls below the lower threshold intensity.

To properly calibrate and test the dimmer device, it is advantageous, if not essential, to provide a variable intensity test light which exactly duplicates the headlights from oncoming vehicles on the road. At the same time, it is highly desirable that the testing and calibrating apparatus be compact and simple to set up and operate.

Accordingly, it is an object of the present invention to provide an apparatus for calibrating and testing an automatic headlamp dimmer so that the dimmer will function properly under normal operating conditions. Another object of the invention is the provision of a testing and calibrating apparatus for automatic headlamp dimmers and the like which exactly duplicates the light conditions encountered by the device under normal operating conditions. Still another object of the invention is to provide a testing and calibrating apparatus for automatic headlamp dimmers and the like which exactly duplicates the lighting encountered under normal operating conditions but which, at the same time is compact, simple to set up and to operate.

These and other objects of the invention are carried out by the provision of a test lamp comprising a housing having an accurately sized light opening therein adapted for accurate positioning within a headlamp dimmer light pickup unit, a light source of variable intensity within the housing positioned at a predetermined distance from the opening thereby providing a cone of light which duplicates that normally encountered by the pickup unit under driving conditions, means for varying the light intensity of said light source and means for measuring said light intensity.

Other objects and advantages of the invention will appear more clearly from the following description of a preferred embodiment and from the drawings in which:

Figure 3 is a side view with parts broken away of the test lamp of the apparatus assembled in an automatic dimmer light pickup unit;

Figure 4 is a sectional view of the test lamp;

Figure 5 is an exploded view of certain parts of the test lamp shown in Figure 4;

Figure 6 is a rear view with parts broken away of the test lamp shown in Figure 4; and Figure 7 indicates the relationship between the spot of light projected by the test lamp of the apparatus and photosensitive element of the device being tested.

Figure 1:
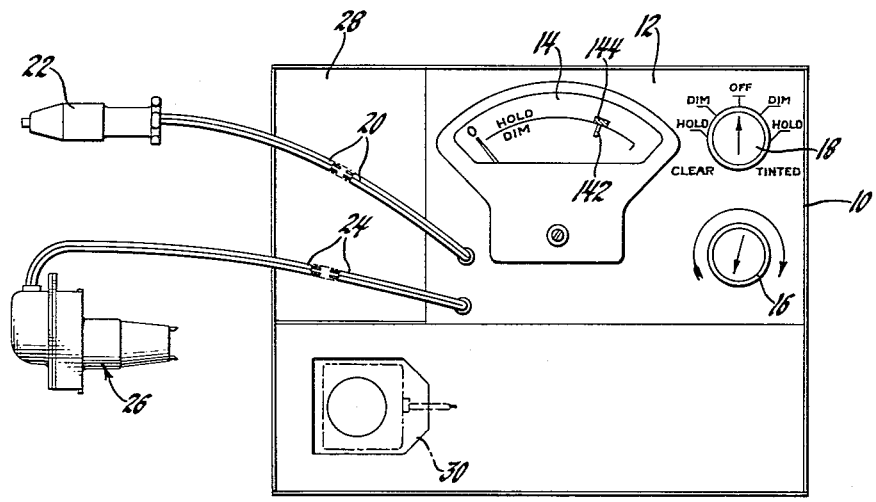
Figure 1 is a top view of one embodiment of the invention.

Referring now to the drawings, Figure 1 shows a top view of one embodiment of the testing and calibrating apparatus which includes a suitable case 10 containing the electrical circuit and its various component parts, the control panel of which is shown at 12. This control panel 12 comprises a sensitivity meter 14, a light intensity rheostat control knob 16 and a meter range selector switch control knob 18. The function and operation of these controls will be explained in detail hereinafter. Electrical energy for the apparatus is provided through the cable 20 which is adapted for electrical connection with the cigarette lighter, normally provided on the automobile instrument panel, by means of the electrical connector 22. Extending from the control panel 12 is a second electric cable 24 which connects to a test lamp 26. As hereinafter fully described, this test lamp 26 is designed for attachment to the automatic headlamp dimmer light pickup unit and is adapted to exactly duplicate the light from oncoming vehicles as they are encountered on the road.

It is advantageous to provide the apparatus case with a compartment 28 for carrying the electrical cables 20 and 24 when the apparatus is not in use and also to provide a recess 30 suitably padded for carrying the test lamp when it is not in use and thereby prevent damage.

Figure 2:
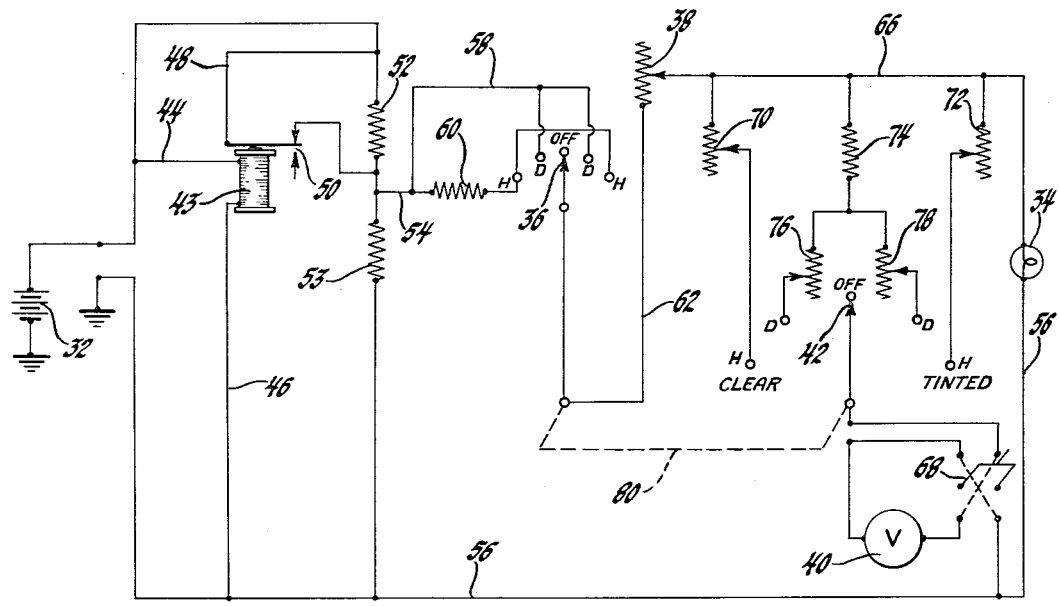
Figure 2 is a diagram of the electrical circuit used in the apparatus shown in Figure 1.

The electrical circuit for the testing and calibrating apparatus is shown in Figure 2 and includes a source of current such, for example, as a battery 32, a test light 34, a test light intensity switch 36, a rheostat 38 for varying the intensity of the test light a light sensitivity meter 40 and a meter range selector switch 42.

To allow the use of either a 6 or 12 volt power supply, the circuit is provided with a relay 43, the coil of which is connected across the power source by conductors 44 and 46, and a voltage divider comprising resistors 52 and 53. When a 6 volt power supply is used, the relay will not be energized and thus the current will flow through the by-pass 48 and the closed contact indicated at 50. However, when a 12 volt power supply is used, the relay will be energized so as to open the contact 50 thereby forcing the current to flow through the resistor 52 which is sufficient to reduce the voltage to 6 volts. Thus, by means of the relay 43 the potential across conductors 54 and 56 is always 6 volts or less regardless of whether the current source supplies 6 or 12 volts.

The light intensity switch 36 has four contacts, two of which are designated by D (dim) and are connected by 58 directly to the conductor 54, and the other two of which are designated by H (hold) and are connected through the fixed resistance 60 to the conductor 54. Thus, when switch 36 is in either of the two dim positions, current will flow directly through the switch to the conductor 62, no resistance being in the circuit at this point whereas, if the switch is in either of the two hold positions, the current will flow through the resistor 60 and the switch to the conductor 62 thereby resulting in a lesser light intensity from the test light 34.

The intensity of the test light may also be controlled by means of the rheostat 38 to which the conductor 62 connects and which itself is electrically connected to the test light 34 by means of the conductor 66. The test light is grounded by means of the conductor 56.

Connected in series across the conductors 66 and 56 are the meter 40 and selector switch 42. A double-pole double-throw reversing switch 68 is employed in connecting the meter between the switch 42 and the conductor 56 in order that the same meter readings can be used for either negative or positive ground. The selector switch 42 has four contacts: H (hold) clear, D (dim) clear, H (hold) tinted and D (dim) tinted. The two hold contacts are connected to the conductor 66 through the adjustable resistances 70 and 72 and the two dim contacts are connected to 66 through fixed resistance 74 and adjustable resistances 76 and 78 respectively. Resistors 70, 72, 76 and 78 are made adjustable so that they can be calibrated during manufacture of the apparatus and so that the unit may be recalibrated to suit the particular type of device for which it is to be used.

It will be noted that the intensity switch 36 is operated simultaneously with the selector switch 42, the two being mechanically connected for operation by the single control knob 18 as indicated at 80.

The operation of the circuit will be understood from the description given hereinafter of the operation in calibrating an automatic headlamp dimmer device.

In the embodiment shown and described herein, the test lamp 26 is particularly adapted for use in conjunction with the light pickup unit of the "Autronic Eye" which is manufactured by the assignee of the present invention. This light pickup unit is the subject of U. S. patent application Serial No. 255,764. As is shown in Figures 4, 5 and 6, this test lamp 26 comprises a housing 90 having a circular opening 92 at one end thereof and a light source comprising the test light 34 and a neutral filter 94 positioned between the test light and the circular opening 92. The rear portion 96 of the housing is shaped to fit snugly into the lens or light opening of the dimmer light pickup unit. Since the lens opening of the "Autronic Eye" light pickup unit is rectangularly shaped, the rear portion 96 of the housing of the embodiment of the test light shown is likewise rectangularly shaped and is sized to fit the aforementioned lens opening. As can best be seen in Figures 4 and 5, this rear portion 96 of the lamp housing is also provided with a pair of locating lugs 98 and 100 which are positioned to fit into the slots on the "Autronic Eye" light pickup unit casing, these slots normally being occupied by similarly shaped locating lugs on the condensing lens which is removed for insertion of the test lamp.

The front portion 102 of the housing is of reduced cross-sectional dimension thereby adapting it to fit into the casing of the light pickup unit. In the particular embodiment shown, this front portion 102 of the housing is cylindrically shaped at one end as shown at 104 and conically shaped at the free end as shown at 106, there being an internal annular shoulder 108 at the junction of the two differently shaped portions to provide a seat for the filter 94. The front surface of the housing is provided with a pair of locating projections 110 and 112 having tapered end surfaces. These projections are adapted to fit closely adjacent the filter element and seat between baffles (not shown) within the "Autronic Eye" pickup unit and in cooperation with the locating lugs 98 and 100 assure correct positioning of the circular opening 92.

The test light 34 is secured within the housing by means of an apertured support plate 114 and a test light terminal cover 116 which forms the back of the housing 90. The support plate 114 and cover 116 are secured together by means of threaded member 118 and are both secured to the rear portion of the housing by means of threaded members 120, 122 and 124. A rubber grommet 126 in the opening for the cable 24 assures a light proof structure.

The filter element 94 is held seated against the shoulder 108 by means of a compressed coil spring 128, one end of which abuts the filter 94, and the other end of which abuts the bulb support plate 114.

As a neutral filter element, we prefer to use a piece of exposed photographic film 130 pressed between two glass plates 132 and 134. Such a filter is advantageous not only because of its ability to duplicate light conditions as they occur on the road but also because the photographic film can be calibrated, by regulating its time of exposure, to the lighting characteristics of the particular test bulb used. Thus, the amount of light emanating from the filter can be precisely fixed. It will be noted that while the light from the test lamp originates with the bulb 34, the source of light insofar as the opening 92 is concerned, is the filter 94.

As a test light 34 we prefer to use a one candlepower light bulb. As described above, if the bulb used has a candlepower rating slightly greater or lesser than one candlepower, compensation can be made in the filter.

In the "Autronic Eye," the ratio between the dim and hold threshold light intensities is 10 to 1; therefore, resistance 60 is such as to operate the test light 34 at about $\frac{1}{10}$ its rated candlepower when the switch 36 (together with switch 42) is in either of the hold positions.

The cone of light obtained from the test lamp is such as to produce a spot of light on the phototube cathode, the diameter of the spot being slightly greater than the width of the cathode. This light pattern is illustrated in Figure 7 wherein 146 indicates the cathode and 148 the light spot. For testing and calibrating the "Autronic Eye," the test lamp should be such as to project a spot of light having about ½ inch diameter at a distance of about ⅝ inch from the aperture 92. To accomplish this, we prefer to use a filter 94 having a diameter of about ¾ inch, an aperture 92 having a diameter of about $\frac{5}{32}$ inch and a distance between the filter and the aperture of about 1 inch. It will be understood, however, that other combinations of sizes and dimensions may be used to accomplish the aforementioned spot of light.

By means of these optics, we are able to obtain a cone of relatively parallel light rays which duplicates almost exactly that produced by the headlamps of oncoming vehicles when it is focused by the pickup unit condensing lens.

To assemble the test lamp 26 to the "Autronic Eye" light pickup unit 136 (refer to Figure 3), the condensing lens (not shown) of the light pickup unit is first removed from the light opening 138. The test lamp 26 is then inserted into the "Autronic Eye" pickup unit in place of the condensing lens until the locating projections 110 and 112 are closely adjacent the filter element 140 and the locating lugs 98 and 100 are seated in the slots provided in the pickup unit casing. The housing of the test lamp is so dimensioned that the fit into the light pickup unit casing is snug enough to make unnecessary additional fastening or securing means to maintain the test lamp in proper position. The surface of those portions of the test lamp which are inserted into the "Autronic Eye" pickup unit casing are provided with a dull, black finish so as to avoid light reflection.

With the test lamp positioned in the light pickup unit as described, and with the automatic dimmer circuit "turned on," the dimmer is tested and calibrated as follows:

If the windshield of the vehicle on which the dimmer is mounted is tinted, the selector switch control knob 18 is turned to the dim (D) tinted position whereas, if the windshield is clear, it is turned ot the dim (D) clear position. The intensity rheostat control knob 16 is turned all the way counterclockwise and the connector 22 is plugged into the cigarette lighter socket. With the headlamps on high beam, the intensity rheostat control knob 16 is turned slowly clockwise, thereby slowly increasing the intensity of the test light 34, until the headlamps switch to dim condition. If the dimmer is properly calibrated, the pointer of the meter 14 should read within the dim sensitivity adjustment line 142. If such a meter reading is not obtained, the phototube sensitivity control provided on the dimmer device (not shown) is adjusted accordingly and the test repeated.

When the dimmer is correctly adjusted for dimming, it is next adjusted for hold sensitivity. To do this, the selector switch control knob 18 is turned to hold (H) tinted or hold (H) clear according to the type windshield on the vehicle, and the intensity rheostat control 16 is turned all the way clockwise. The vehicle headlamps are, of course, in the low beam or dim condition at this point. Then the intensity rheostat control knob 16 is slowly turned counterclockwise, thereby decreasing the intensity of the light 34 until the headlamps switch to high beam or bright. If the dimmer is properly calibrated, the pointer of the meter 14 should read within the hold sensitivity line 144. If such a meter reading is not obtained, the phototube sensitivity control provided on the dimmer device is adjusted accordingly and the test repeated.

From the above description of a preferred embodiment of the invention, it will be apparent that various changes and modifications can be made, all within the spirit and intended scope of the invention. For example, if the automatic dimmer to be tested utilizes a time delay holding means, the testing circuit can be simplified accordingly. Also, the shape and optics of the test lamp may be modified to fit the particular shape and optics of the pickup unit with which it is to be used.

We claim:

1. A testing and calibrating apparatus for an automatic headlamp dimmer of the type having a photosensitive element as the actuating device, said apparatus comprising a test lamp and an electrical circuit for said test lamp including a source of electrical energy, means for varying the intensity of the light from said test lamp, and means for measuring the intensity of the light from said test lamp, said test lamp having a housing with a circular opening at one end thereof, means on said housing for positioning said opening in a predetermined position with respect to said photosensitive element, a light bulb mounted in said housing and a light filter having a diameter of about ¾ inch positioned between said light source and said opening, the diameter of said opening being about ³⁄₃₂ inch and the distance between said filter and said opening being about 1 inch.

2. In an apparatus for testing photosensitive devices, a test lamp comprising a housing having an opening at one end thereof and a light source within said housing, said light source consisting of a light bulb mounted in said housing and a light filter positioned between and spaced from said light bulb and said opening, said light filter comprising an exposed photographic film pressed between two flat glass members, and an electrical circuit for said test lamp including a source of electrical energy, means for varying the intensity of the light from the test lamp and means for measuring the intensity of the light from the test lamp.

3. In an apparatus for testing an automatic headlamp dimmer actuated by a photosensitive element, a test lamp comprising a housing having an opening at one end thereof, a light source within said housing, said light source consisting of a light bulb mounted in said housing and a light filter positioned between and spaced from said light bulb and said opening, and means on said housing for positioning said opening adjacent the photosensitive element of the automatic headlamp dimmer, and an electrical circuit for said test lamp including a source of electrical energy, means for varying the intensity of the light from the test lamp and means for measuring the intensity of the light from the test lamp.

4. In an apparatus for testing and calibrating an automatic headlamp dimmer actuated by a light pickup unit containing a photosensitive element, a test lamp comprising a housing having a rear portion of enlarged cross-sectional area shaped to fit snugly in the light opening of said pickup unit and a front portion of reduced cross-sectional area to fit into the light pickup unit, said front portion being provided with an internal shoulder, a circular opening at the free end of said front portion, means on said housing cooperative with the pickup unit to accurately position said opening in a predetermined position with respect to the photosensitive element, a light bulb mounted within the rear portion of said housing, a neutral light filter in the front portion of said housing between said light bulb and said opening, and resilient means for maintaining said filter in abutting relationship with said internal shoulder, and an electrical circuit for said test lamp including a source of electrical energy, means for varying the intensity of the light from the test lamp and means for measuring the intensity of the light from the test lamp.

References Cited in the file of this patent

UNITED STATES PATENTS

| | | |
|---|---|---|
| 1,771,533 | Foster | July 29, 1930 |
| 1,898,219 | Sharp | Feb. 21, 1933 |
| 1,906,597 | Hoare | May 2, 1933 |
| 1,958,879 | Anthony | May 15, 1934 |
| 1,969,459 | Fuller | Aug. 7, 1934 |
| 2,026,156 | Alexander | Dec. 31, 1935 |
| 2,038,514 | Hummert | Apr. 21, 1936 |
| 2,045,704 | Ferree | June 30, 1936 |
| 2,140,368 | Lyle | Dec. 13, 1938 |
| 2,309,104 | Dircksen | Jan. 26, 1943 |
| 2,535,916 | Gradisar | Dec. 26, 1950 |
| 2,627,019 | Wieskopf | Jan. 27, 1953 |

FOREIGN PATENTS

| | | |
|---|---|---|
| 346,620 | Great Britain | Apr. 16, 1931 |